United States Patent [19]

Hiraguchi

[11] Patent Number: 4,935,919
[45] Date of Patent: Jun. 19, 1990

[54] FULL DUPLEX MODEM HAVING TWO ECHO CANCELLERS FOR A NEAR END ECHO AND A FAR END ECHO

[75] Inventor: Masayoshi Hiraguchi, Tokyo, Japan

[73] Assignee: NEC Corporation, Japan

[21] Appl. No.: 96,644

[22] Filed: Sep. 14, 1987

[30] Foreign Application Priority Data

Sep. 16, 1986 [JP] Japan .................................. 61-218409

[51] Int. Cl.[5] ............................................ H04B 3/23
[52] U.S. Cl. .................................. 370/32.1; 379/410
[58] Field of Search ............... 379/410, 411, 406, 377; 370/32, 32.1

[56] References Cited

U.S. PATENT DOCUMENTS

| | | | |
|---|---|---|---|
| 3,721,777 | 3/1973 | Thomas | 379/410 |
| 3,860,768 | 1/1975 | Wehrmann | 379/410 |
| 4,577,309 | 3/1986 | Barazeche et al. | 370/32 |
| 4,582,963 | 4/1986 | Danstrom | 379/411 |
| 4,587,382 | 5/1986 | Yang | 379/410 X |
| 4,593,161 | 6/1986 | Desblache et al. | 379/377 |
| 4,742,510 | 5/1988 | Quatieri, Jr. et al. | 370/32.1 |
| 4,751,730 | 6/1988 | Galand et al. | 379/410 |
| 4,805,215 | 2/1989 | Miller | 379/411 |

Primary Examiner—Jin F. Ng
Assistant Examiner—Randall S. Vaas
Attorney, Agent, or Firm—Laff, Whitesel, Conte & Saret

[57] ABSTRACT

An echo canceller in a modem cancels echoes from hybrid transformers on both the near end and the far end. The echo canceller has a variable delay which may be adjusted to conform to a round trip of an echo. An adaptive filter has a number of delay circuits, each adding an increment of delay. A number of these delay circuits are selected in order to provide a selected delay time.

3 Claims, 2 Drawing Sheets

FULL DUPLEX MODEM HAVING TWO ECHO CANCELLERS FOR A NEAR END ECHO AND A FAR END ECHO

BACKGROUND OF THE INVENTION

The present invention relates to a modem having echo cancellers, and more particularly to a modem for two-wire full-duplex communications having two echo cancellers for a near end echo and a far end echo.

A modem for two-wire full-duplex communications (hereinafter referred to simply as "modem") has to cancel a near end echo originating from a hybrid transformer of a local modem and a far end echo which results from the return to the local modem of an echo generated at a hybrid transformer of a remote modem in response to data sent from the local modem.

Since a change in the opposite party participating in a communication usually entails a variation in communication routes or paths, the round-trip delay from the time a datum is transmitted until it comes back from this far end as an echo also varies correspondingly. A prior art modem copes by means of such variations in round-trip delay with a variable delay circuit for delaying the start timing of far end echo cancellation. The modem is arranged before a far echo canceller. This far end echo, when passing a converter on the transmission path, undergoes a phase roll due to the frequency offsetting or phase jitter of the carrier. Since the phase roll increases the uncancelled residue of the far end echo, the far echo canceller is provided with a phase corrector for automatic adaptive correction of the phase roll.

In the prior art modem, if the round-trip delay is short, the time regions of the near end echo cancellation and of the far end echo cancellation for one transmitted datum will overlap each other. In such an overlapped time region, two echo cancellers, one for the near end echo and the other for the far end echo, cancel the echoes of the same transmitted datum at the same time. As a result, the convergence velocity in training is significantly reduced, or even divergence occurs instead of convergence, to obstruct the start of communications. This problem is especially serious where the far end echo canceller has a phase corrector.

SUMMARY OF THE INVENTION

An object of the present invention is to solve the foregoing problem with a modem having echo cancellers whose time of convergence in echo cancellation does not decrease even where the round-trip delay is short.

According to the invention, a modem comprises a first echo canceller for cancelling a near end echo and a second echo canceller for cancelling a far end echo. The second echo canceller has a variable delay circuit which is responsive to the round-trip delay of the far end echo for setting the start of timing of the cancellation of the far end echo. A comparator compares the round-trip delay and the echo cancellation time of the first echo canceller. A control circuit is responsive to the output of the comparator to control the echo cancellation time of the first echo canceller.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENT

Figure 1:
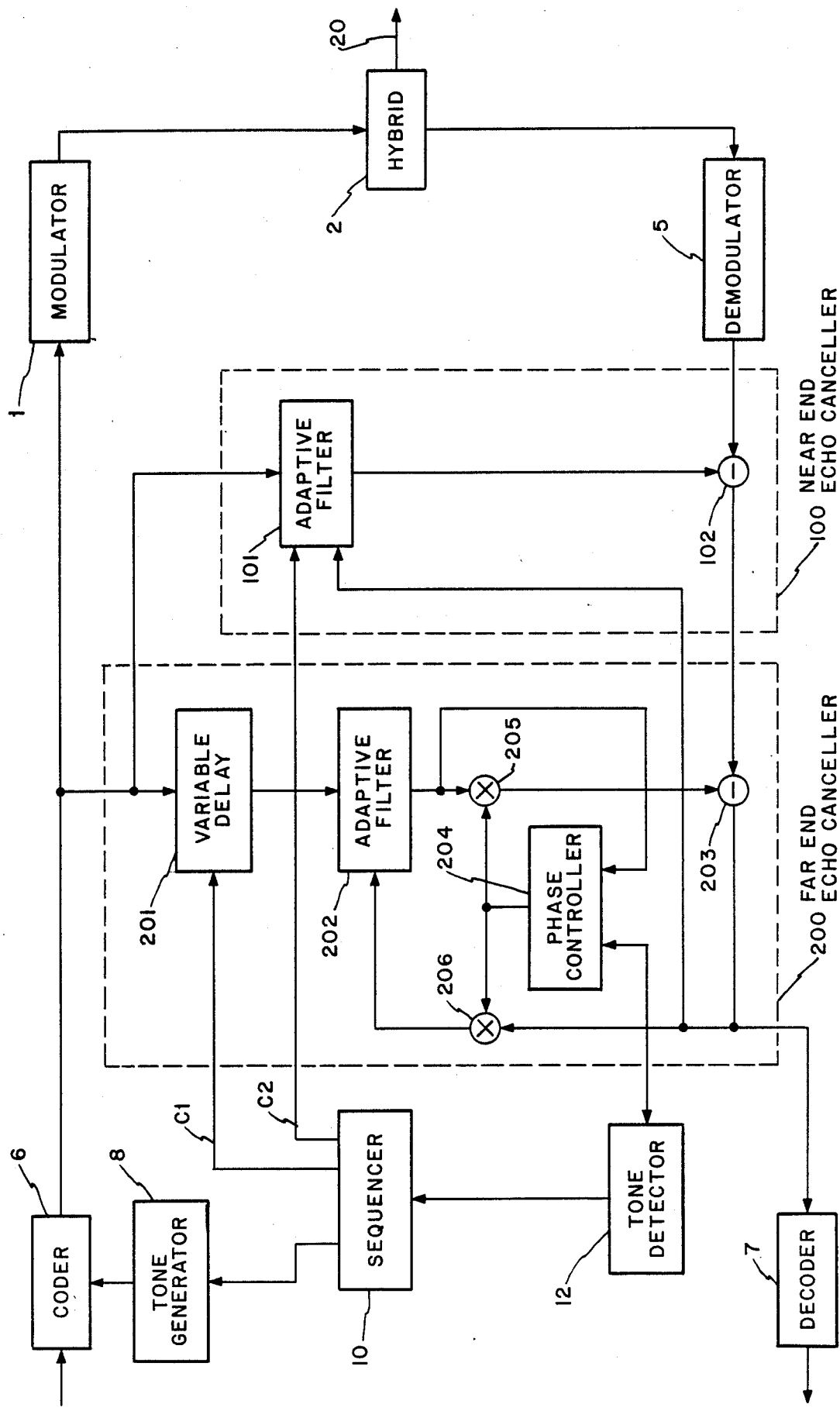
FIG. 1 is a block diagram illustrating a preferred embodiment of the invention.

In reference to FIG. 1, a transmit datum is modulated, for example, in a quadrature amplitude modulation scheme, by a modulator 1. The resulting modulated signal is fed to a transmission line 20 by way of a hybrid transformer 2. A modulated signal from a remote modem (not shown) is receive and applied to a demodulator 5 which produces a demodulated signal. A near end echo canceller 100 cancels, out of the demodulated signal, a near end echo which occurs when the modulated signal is transmitted through the hybrid transformer 2, and produces a near end echo residual signal which is applied to a far end echo canceller 200. The far end echo canceller 200 cancels a far end echo from the demodulated signal and generates a far end echo residual signal.

Means are provided for setting the cancellation start timing of the far end echo. More particularly, in the far end echo canceller 200, a variable delay circuit 201 gives the round-trip delay of the far end echo to the transmit datum. An adaptive filter 202 is responsive to the delayed transmit datum and the far end echo residual signal in order to generate a far end echo replica. A subtractor circuit 203 generates the far end echo residual signal by subtracting the far end echo replica from the demodulated signal (a near end echo cancellation signal here). The delay time of the variable delay circuit 201 is set by a first control signal C1 which is supplied from a sequencer 10, indicating the round-trip delay. A phase controller 204 obtains the phase difference between the far end echo replica and the far end echo residual signal the difference being used for correcting the phase roll of the far end echo. Multipliers 205 and 206 multiply the far end echo replica and the far end residual signal by the phase difference to match the phases of the echo replica and the residual signal. For further details on the phase roll, reference may be made to the U.S. Pat. No. 4,621,173.

A near end echo canceller 100 has an adaptive filter 101 which is responsive to the transmit datum and to the far end echo residual signal for generating a near end echo replica. A subtractor circuit 102 subtracts the near end echo replica from the demodulated signal. The filter 101 controls, when the round-trip delay is shorter than a prescribed time, the number of filter taps in responsive to a second control signal C2 which is supplied from the sequencer 10. This filter will be described in further detail elsewhere, with reference to FIG. 2.

The modem in FIG. 1 also includes an encoder (U.S. Pat. No. 4,077,021) 6 which converts transmission data into predetermined codes which are resistant to transmission errors and a decoder 7 therefor. The modem further includes the sequencer 10 for controlling a start-up procedure as defined by CCITT Recommendation V.32, a tone generator 8 for generating tones which are necessary for such a procedure and a tone detector 12 for detecting tones which are transmitted through the line 20. These tone generator and detector are used for measuring the round-trip delay. The sequencer 10 comprises a microprocessor which is programmed to execute the procedure including a round-trip delay measurement according to Recommendation V.32. The sequencer 10, in response to the measured delay, generates the first control signal C1 for setting the delay which is to be give by the variable delay circuit 201 and the second control signal C2 for altering the tap length of the filter 101.

Figure 2:
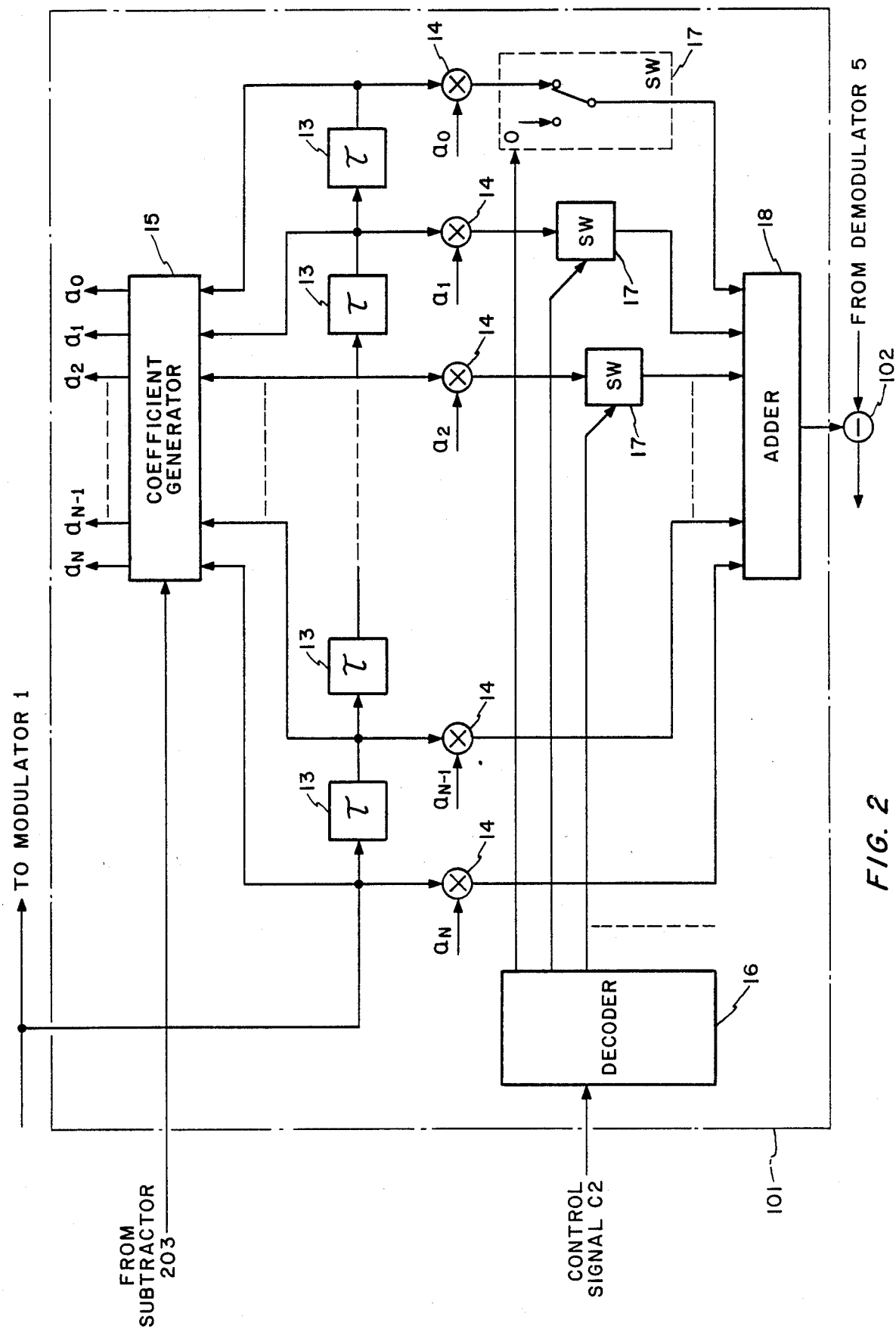
FIG. 2 is a circuit diagram illustrating an adaptive filter for use in the invention.

FIG. 2 is a block diagram illustrating a typical structure for the adaptive filter 101, which has N delay circuits 13 each having a prescribed delay time $\gamma$, $N+1$ multipliers 14 for multiplying the outputs of the delay circuits by coefficients $a_0$ to $a_N$, and an adder 18 for adding the products of multiplication. A coefficient generator 15 generates the coefficients $a_0$ to $a_N$ based on the outputs of the delay circuits and the far end echo residual signal. Between the multipliers 14, to which coefficients $a_0$ to $a_m$ ($m \leq N$, $m < N$ in FIG. 2) are given, and the adder circuit 18 are switches 17 for selecting either zero or the products of the multiplication by the multipliers 14. Each of the switches 17 is controlled by a switch selection signal which is supplied from a decoder 16.

Means are provided for setting the echo cancellation time of the first echo canceller. More particularly, in this structure, if the sequencer 10 judges the round-trip delay $t_F$ to be greater than the maximum response time $(N+1)\cdot\gamma$ of the adaptive filter 101, the sequencer 10 sends the control signal C2 to the decoder 16 to cause every switch 17 to be connected to the multiplier 14. Meanwhile, if the sequencer 10 judges the round-trip delay $t_F$ to be not greater than the maximum response time $(N+1)\cdot\gamma$ of the adaptive filter 101, it sends the control signal C2 to the decoder 16 to connect the switches 17 of the multipliers 14 receiving coefficients $a_0$ to $a_{n-M}$ to the zero and the switches 17 of the multipliers 14 receiving coefficients $a_{N-M+1}$ to $a_m$ to the multiplier 14. Thus the adaptive filter 101 operates responsive to the second control signal C2 for altering the filter tap number so as not to let its own echo cancellation overlap the far end echo cancellation (i.e. the echo cancellation of the echo canceller 200 in FIG. 1). Incidentally, it is obvious that the switches 17 may also be positioned midway in the signal lines between coefficients $a_0$ to $a_m$ or midway of the tap output.

Since it is possible to prevent the overlapping of the echo cancellation of the echo cancellers 100 and 200 for near end and far end echoes, respectively, even if the round-trip delay is short, the present invention can provide a modem having echo cancellers whose convergence velocity of echo cancellation is not retarded.

Although the far end canceller is arranged after the near end echo canceller in the preferred embodiment of the invention hitherto described, the near end canceller may also be positioned after the far end canceller.

What is claimed is:

1. A full-duplex modem comprising:
    a first echo canceller for cancelling a near end echo,
    a second echo canceller with a variable delay circuit responsive to the round-trip delay of a far end echo for setting the cancellation start timing of said far end echo,
    comparator means for comparing said round-trip delay and the echo cancellation time of said first echo canceller, and
    control means responsive to the output of said comparator means for controlling the echo cancellation time of said first echo canceller.

2. A full-duplex modem as claimed in claim 1, wherein:
    said first echo canceller comprises delay circuits for producing N outputs, N multiplier circuits for multiplying the N outputs by N filter coefficients, and an adder circuit for adding the multiplication products of said multiplier circuits, and
    said control means comprises M switches connected to M out of said N multiplier circuits, and decoder means responsive to the output of said comparator means for controlling these M switches.

3. An echo cancelling modes for a transmission path comprising:
    a near end echo canceller and a far end echo canceller coupled across send and receive legs, said far end echo canceller having a variable delay circuit with a delay selected responsive to the time required for a round trip of an echo, said send and receive legs being interconnected by a transmission line via a hybrid transformer, whereby hybrid reflections may cause echoes to form at both the near end and the far end of said transmission line;
    sequencer means coupled to control said near end and said far end echo cancellers, said sequencer means having a microprocessor programmed to measure a round trip delay;
    means for detecting a difference between a delay resulting from said round trip and echo cancellation time of said near end echo canceller; and
    means for adjusting said echo cancellation time of the near end echo canceller in response to said means for detecting a difference.

* * * * *